United States Patent [19]

Greenwood

[11] Patent Number: 4,519,485

[45] Date of Patent: May 28, 1985

[54] DRIVELINE FOR REGENERATIVE BRAKING

[75] Inventor: Christopher J. Greenwood, Preston, England

[73] Assignee: Leyland Vehicle Limited, England

[21] Appl. No.: 359,505

[22] Filed: Mar. 18, 1982

[51] Int. Cl.³ .............................................. B60K 41/02
[52] U.S. Cl. ............................... 192/0.033; 192/0.076; 192/103 R; 192/4 A; 192/48.92
[58] Field of Search ............... 192/0.033, 0.042, 0.044, 192/0.075, 0.076, 103 R, 0.096, 0.098, 4 A, 48.3, 48.92; 74/572; 180/165

[56] References Cited

U.S. PATENT DOCUMENTS

| | | | |
|---|---|---|---|
| 3,641,843 | 2/1972 | Lemmer | 180/165 X |
| 3,749,194 | 7/1973 | Bardwick | 180/165 X |
| 3,882,950 | 5/1975 | Strohlein | 180/165 |
| 3,923,115 | 12/1975 | Helling | 180/165 X |
| 4,041,801 | 8/1977 | Anderson | 74/572 |
| 4,276,951 | 7/1981 | Smitley | 192/0.055 X |
| 4,393,964 | 7/1983 | Kemper | 192/0.076 X |
| 4,411,171 | 10/1983 | Fiala | 192/0.076 X |

FOREIGN PATENT DOCUMENTS 2641886  3/1978  Fed. Rep. of Germany ...... 180/165

Primary Examiner—George H. Krizmanich
Attorney, Agent, or Firm—Thomas J. Greer, Jr.

[57] ABSTRACT

A diesel engine 1 drives a continuously-variable-ratio transmission 3 via an over-running clutch 2 and the transmission in turn drives a drive axle 4. A flywheel 5, used to store energy when the vehicle equipped with the driveline is braked, is energized via the transmission and also drives it when returning its stored energy to the vehicle.

The connection between the flywheel 5 and the transmission 3 is via an over-running clutch 6 and a centrifugal clutch 7. The centrifugal clutch closes at a speed which is such that the speed of the gear 9 is a little above the maximum speed it could be driven by the engine 1. When the flywheel 5 is not energized, the centrifugal clutch 7 is open and the engine 1 drives the transmission 3 via the clutch 2 and, after bringing the flywheel up to a speed corresponding to maximum engine speed, the flywheel is not driven so long as the engine speed is below maximum (because of clutch 6). When the flywheel 5 is energized during braking, the centrifugal clutch 7 is closed and the engine is decoupled from the transmission (because of clutch 2).

The transmission is thus driven either by the flywheel or by the engine, and switching between the two takes place automatically.

13 Claims, 1 Drawing Figure

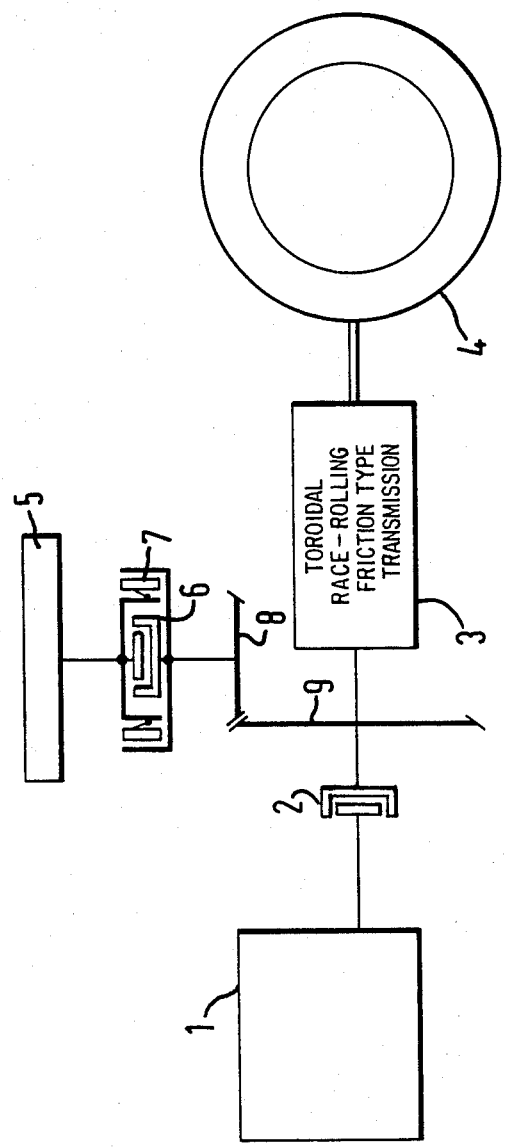

though it is rotating in the same direction. It is, however, rotating at a much reduced rate so that the flywheel is not being driven by the engine through the sprag clutch 6.

DRIVELINE FOR REGENERATIVE BRAKING

This invention relats to drivelines for regenerative braking, especially to those drivelines including continuously-variable-ratio transmissions.

Drivelines of this kind are known, but there are difficulties associated with the control of the engine and flywheel.

The invention provides a driveline which includes a continuously variable ratio transmission, an engine for driving the transmission, and a flywheel for driving the transmission which is itself driven by the transmission to brake the vehicle wherein th flywheel can only drive the transmission when the engine is not driving the transmission.

The fact that the transmission is driven either by the engine or by the flywheel, but not by both together, makes controlling the engine and flywheel simpler.

Advantageously, the flywheel can only drive the transmission at speeds in excess of those at which the engine can drive the transmission.

Advantageously, the engine is coupled to the transmission via an over-running clutch which is arranged to decouple when the speed on the transmission side exceeds that on the engine side, and the flywheel is connected to the transmission downstream of the over-running clutch in the drive direction.

The engine is coupled and decoupled automatically with this arrangement. The engine is automatically decoupled when the flywheel speed is in the range where it can drive the transmission and automatically recoupled when the flywheel can no longer provide drive.

Advantageously, the flywheel is coupled to the transmission via an over-running clutch which is arranged to decouple when the speed on the flywheel side exceeds that on the transmission side, and which is capable of being locked up when a certain flywheel speed is exceeded.

The flywheel thus couples in automatically for energisation but only becomes locked in for de-energisation at a certain speed. Preferably, a centrifugal clutch is provided in parallel with the flywheel over-running clutch in order to lock it up.

The engine could be spark ignition but is preferably compression ignition, and the continuously variable-ratio transmission could be of the pulley and belt type but is preferably of the toroidal race rolling friction type, where traction takes place through an elastohydrodynamic film.

A driveline constructed in accordance with the invention will now be described, by way of example, with reference to the accompanying drawing, which is a schematic view of the driveline.

Referring now to the drawing, the driveline has a diesel engine 1 as prime mover which is coupled to a continuously-variable-ratio transmission 3 via a sprag over-running clutch 2. The continuously-variable-ratio transmission 3 drives a drive axle 4.

A flywheel 5 is provided for the purposes of regenerative braking. The flywheel is coupled to the input of the continuously-variable-ratio transmission downstream of the sprag clutch 2, and via a second sprag clutch 6 which is combined with a centrifugal clutch 7 and drive gears 8 and 9.

The sprag clutches 2 and 6 are arranged so that they over-run, respectively, when the speed of the transmission side 3 exceeds that on the engine side 1 and when the speed on the flywheel side 5 exceeds that on the drive gears 8,9 side. The centrifugal clutch closes when the flywheel speed is greater than the speed the flywheel would have (allowing for the step-up of the gears 8,9) if driven by the engine at its full speed.

The operation of the drive-train is as follows. When starting the engine of the vehicle with the flywheel 5 stationary, the flywheel 5 will be clutched into the engine from the start because of the sprag clutches 2 and 6. The engine is accelerated to its maximum speed, which will then be the minimum operational speed of the flywheel.

During subsequent driving of the vehicle, the flywheel will be turning at a speed wherein it is decoupled by way of the sprag clutch 6 provided the engine speed is less than its maximum value, and the vehicle can be driven in the same way as if the flywheel was not present. (The centrifugal clutch 7 is decoupled since it only engages at a speed above maximum engine speed). If the flywheel speed drops to below the engine maximum speed, it is accelerated again by being coupled to the engine 1 through the sprag clutch 6 and becomes decoupled again when the engine speed reduces.

Regenerative braking takes place by accelerating the flywheel 5, achieved by downshifting the transmission 3, and the energy of the vehicle is fed via the drive axle 4 along the transmission 3 from the output and to the input end. The input accelerates above the maximum engine speed, causing the engine sprag to freewheel, and the flywheel sprag 6 to couple. Regenerative braking now takes place.

When the flywheel accelerates to a particular value above that corresponding to maximum engine speed, the centrifugal clutch 7 closes.

The flywheel 5 is now locked into the driveline until it slows down to the value at which the centrifugal clutch opens. Since this value is above that corresponding to maximum engine speed, it follows that the engine is decoupled from the driveline during this time. The stored energy is now available for vehicle drive through the transmission 3.

As the flywheel 5 approaches the speed at which the centrifugal clutch 7 opens, the clutch will slip and the slow down of the input of the transmission 3 will increase. The engine must now be accelerated from idle to its required running speed, and the sprag clutch 2 will couple when the speed on the engine side equals that on the transmission input side. The engine is now available for normal drive. The drag torque produced by the slipping centrifugal clutch is used to bridge the switch from flywheel to engine power, and will disappear as it further slows the flywheel. However, the speed of the flywheel 5 will still be above that of gear 8 and the sprag clutch 6 will be overrun.

As an example of suitable speeds of operation the diesel engine may have a maximum speed of approximately 3000 rpm and the centrifugal clutch 7, which governs the speeds at which the flywheel can drive the transmission may close at a value such that the speed of drivegear 9 is within the range 3250 rpm to 3500 rpm. The maximum fywheel speed may be such that the speed of drivegear 9 is approximately 6000 rpm.

The minimum flywheel speed will be the maximum speed of the engine. If during long periods of engine only running the flywheel drops below this referred speed (referred speed being the speed at the drivegear 9) i,e, 3000 rpm, the engine accelerates to bring it back to 3000 rpm, this could be accomplished by means of a sensor on the flywheel.

However, if the engine was running at a low speed e.g. 1000 rpm, one could then face the problem that the engine would be continually speeding up to bring the flywheel to the referred speed of 3000 rpm and then dropping back, only to speed up again shortly when the flywheel dropped below 3000 rpm again. For this reason, the engine could be allowed an overspeed range, that is, it could speed up to 3250 rpm (with the centrifugal clutch operating now at 3500 rpm) to bring the flywheel to within its operational range, while still having a maximum speed of 3000 rpm if driving the engine only. This will of course ensure that the flywheel will be transparent for all but very short periods.

With the above arrangement, the vehicle will be driven either by the flywheel or by the engine, and switching between the two is automatic.

If it is desired that the flywheel is not clutched in on start-up, for example, to prevent heavy loading on the starter motor, a disconnect clutch could be incorporated.

The engine along could be started on the starter motor, and the flywheel could be engaged with the engine idling. A dryplate clutch could be used as the disconnect clutch. As an alternative, the flywheel could be accelerated from rest before the engine is started by using an electric motor (which could be the starter motor). When the flywheel is running slightly faster than the value corresponding to engine idle speed, the engine is free to start without engaging the sprag clutches.

If desired, a release mechanism could be incorporated in the combined flywheel clutch in order to disconnect the fully energised flywheel. This would improve driveline efficiency with the vehicle stationary.

If desired, the centrifugal clutch could be dispensed with and any clutch (such as a multiplate electrically controlled clutch) could replace it, the clutch being arranged in parallel with the over-running clutch 6 to lock it up over the desired speed range.

Also, the flywheel could be arranged to drive the steering pump, compressors for a brake pump, air compressor for power operated doors, or other ancilliaries normally driven by the engine.

The transmission is preferably a toroidal race rolling friction type. Such transmissions are described for example in paper number 80-C2/DET-59 of the American Society of Mechanical Engineers as well as in United Kingdom Patent Application Number 2023753 and European Patent Publication Number 0006690. Reduction gears may be required at its input to restrict the maximum speed at the input.

The driveline of the invention is suited to use in heavy goods vehicles, where the braking energies are appreciable, and especially to use in public service vehicles (that is, buses) where a lot of stopping and starting is involved.

I claim:

1. A vehicle driveline comprising a continuously-variable-ratio transmission having an input, an engine for driving said transmission, a flywheel, a first power-transmitting means connected between said engine and said transmission input, and a second power-transmitting means connected between said transmission input and said flywheel, said first power-transmitting means including first coupling means operable to drive said transmission by said engine and inoperable to drive said engine by said transmission, said second power-transmitting means including second coupling means operable to selectively drive said flywheel by said engine or said transmission and third coupling means operable to drive said transmission by said flywheel only while said first coupling means is inoperative to drive said transmission by said engine.

2. A driveline according to claim 1 wherein said third coupling means is operable only at a transmission input speed greater a maximum speed of said engine.

3. A driveline according to claim 1 wherein said first coupling means comprises an over-running clutch coupling said engine to said transmission input, said over-running clutch being operable to decouple when the speed on the transmission input of said over-running clutch exceeds that on the engine side of said over-running clutch, and wherein the second power-transmitting means connects said flywheel to said transmission input through said first power transmitting means between said over-running clutch and said transmission input.

4. A driveline according to claim 2 wherein said first coupling means comprises an over-running clutch coupling said engine to said transmission input, said over-running clutch being operable to decouple when the speed on the transmission input of said over-running clutch exceeds that on the engine side of said over-running clutch, and wherein the secon power-transmitting means connects said flywheel to said transmission input through said first power transmitting means between said over-running clutch and said transmission input.

5. A driveline according to claim 1, wherein said second coupling means comprises an over-running clutch coupling said transmission input to said flywheel, said over-running clutch being operable to decouple when the speed on the flywheel side of said over-running clutch exceeds that on the transmission side of said over-running clutch, and wherein said third coupling means is operable to lock up when a preselected flywheel speed is exceeded.

6. A driveline according to claim 2, wherein said second coupling means comprises an over-running clutch coupling said transmission input to said flywheel, said over-running clutch being operable to decouple when the speed on the flywheel side of said over-running clutch exceeds that on the transmission side of said over-running clutch, and wherein said third coupling means is operable to lock up when a preselected flywheel speed is exceeded.

7. A driveline according to claim 3 wherein said second coupling means comprises a second over-running clutch coupling said transmission input to said flywheel, said second over-running clutch being operable to decouple when the speed on the flywheel side of said second over-running clutch, and wherein said third coupling means is operable to lock up when a preselected flywheel speed is exceeded.

8. A driveline according to claim 4, wherein said second coupling means comprises a second over-running clutch coupling said transmission input to said flywheel, said second over-running clutch being operable to decouple when the speed on the flywheel side of said second over-running clutch, and wherein said third coupling means is operable to lock up when a preselected flywheel speed is exceeded.

9. A driveline according to claim 5 wherein said third coupling means comprises a centrifugal clutch in parallel with said over-running clutch.

10. A driveline according to claim 6, wherein said third coupling means comprises a centrifugal clutch in parallel with said over-running clutch.

11. A driveline according to claim 7, wherein said third coupling means comprises a centrifugal clutch in parallel with said second over-running clutch.

12. A driveline according to claim 8, wherein said third coupling means comprises a centrifugal clutch in parallel with said second over-running clutch.

13. A driveline accordance with claim 1 wherein said transmission is of the toroidal race-rolling friction type.

* * * * *

UNITED STATES PATENT AND TRADEMARK OFFICE
CERTIFICATE OF CORRECTION

PATENT NO.   : 4,519,485

DATED        : May 28, 1985

INVENTOR(S)  : Christopher J. Greenwood

It is certified that error appears in the above-identified patent and that said Letters Patent is hereby corrected as shown below:

On the title page, insert the following:

--[30]   Foreign Priority Data

Mar. 18, 1981  [GB]   United Kingdon ..................8108920-- .

Signed and Sealed this

Twenty-fifth Day of August, 1992

Attest:

DOUGLAS B. COMER

*Attesting Officer*　　　　　　　*Acting Commissioner of Patents and Trademarks*